(12) United States Patent
Suzuki

(10) Patent No.: US 12,510,482 B2
(45) Date of Patent: Dec. 30, 2025

(54) GAS ANALYZING METHOD

(71) Applicant: Resonac Corporation, Tokyo (JP)

(72) Inventor: Atsushi Suzuki, Tokyo (JP)

(73) Assignee: Resonac Corporation, Tokyo (JP)

( * ) Notice: Subject to any disclaimer, the term of this patent is extended or adjusted under 35 U.S.C. 154(b) by 140 days.

(21) Appl. No.: 18/037,244

(22) PCT Filed: Nov. 8, 2021

(86) PCT No.: PCT/JP2021/041055
§ 371 (c)(1),
(2) Date: May 16, 2023

(87) PCT Pub. No.: WO2022/113719
PCT Pub. Date: Jun. 2, 2022

(65) Prior Publication Data
US 2024/0003815 A1    Jan. 4, 2024

(30) Foreign Application Priority Data
Nov. 30, 2020    (JP) .................................. 2020-199011

(51) Int. Cl.
*G01N 21/65*    (2006.01)
*G01N 33/00*    (2006.01)

(52) U.S. Cl.
CPC ......... *G01N 21/65* (2013.01); *G01N 33/0027* (2013.01)

(58) Field of Classification Search
CPC ............... G01N 21/65; G01N 33/0027; G01N 33/0011; G01N 21/15
See application file for complete search history.

(56) References Cited

U.S. PATENT DOCUMENTS 6,493,086 B1 *   12/2002   McAndrew ......... C23C 16/4412
                                                              250/341.4
7,176,464 B2 *   2/2007    Oka ................... G01N 21/3504
                                                              250/343
2006/0118723 A1   6/2006   Kimata

FOREIGN PATENT DOCUMENTS

| CN | 201803886 U | | 4/2011 |
| CN | 104165882 A | * | 11/2014 |
| CN | 110346346 A | | 10/2019 |
| JP | 09325114 A | * | 12/1997 |
| JP | 2000-298095 A | | 10/2000 |

(Continued)

OTHER PUBLICATIONS

International Search Report for PCT/JP2021/041055 dated Dec. 21, 2021.

(Continued)

*Primary Examiner* — Dominic J Bologna
*Assistant Examiner* — Roberto Fabian, Jr.
(74) *Attorney, Agent, or Firm* — Sughrue Mion, PLLC

(57) ABSTRACT

There is provided a gas analyzing method capable of analyzing impurities in a sample gas with high accuracy by reducing the influence of water present in a gas cell. The gas analyzing method is a method for analyzing the impurities contained in the sample gas, and includes: a pretreatment step of reducing the partial pressure of water in a gas cell (10) into which the sample gas is introduced to 10 Pa or less; and an analysis step of introducing the sample gas into the gas cell (10) in which the pretreatment step has been carried out and detecting the impurities by Raman spectroscopy.

7 Claims, 1 Drawing Sheet

(56) References Cited

FOREIGN PATENT DOCUMENTS

JP      2005024251  A  *  1/2005
JP      2005140558  A  *  6/2005
WO    2004/015401  A1     2/2004

OTHER PUBLICATIONS

Chengwei Wen et al., "Multiple-pass enhanced Raman spectroscopy for fast industrial trace gas detection and process control", Journal of Raman Spectroscopy, 2020, vol. 51, pp. 781-787 (7 pages).
I. R. Beattie et al., "Gas-phase Raman Spectroscopy of Trigonal Bipyramidal Pentachlorides and Pentabromides", Inorg. Phys. Theor., J. Chem. Soc. (A), 1969, pp. 1691-1693 (3 pages).

* cited by examiner

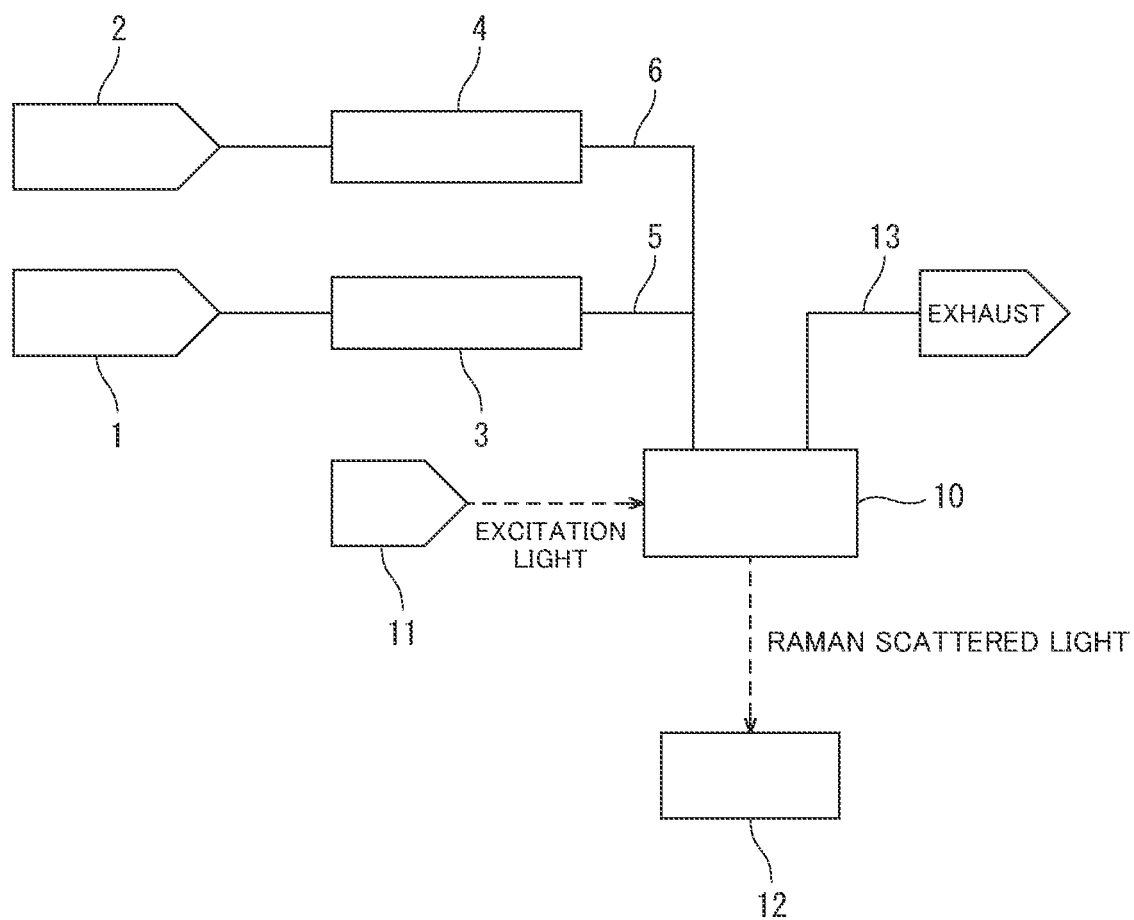

GAS ANALYZING METHOD

TECHNICAL FIELD

The present invention relates to a gas analyzing method.

BACKGROUND ART

As a method for analyzing impurities in a gas, a method for irradiating a sample gas enclosed or circulating in a gas cell with a laser beam for analysis is mentioned (for example, see PTL 1).

CITATION LIST

Patent Literature

PTL 1: JP 2005-140558 A

SUMMARY OF INVENTION

Technical Problem

However, the gas analyzing method disclosed in PTL 1 has posed a risk that, when water is present in the gas cell and the impurities to be analyzed can react with water, a reaction between the impurities and the water proceeds during analysis, resulting in a decrease in the analysis accuracy decreases.

It is an object of the present invention to provide a gas analyzing method capable of analyzing the impurities in the sample gas with high accuracy by reducing the influence of the water present in the gas cell.

Solution to Problem

To solve the above-described problem, one aspect of the present invention is as described in [1] to [4] below.

[1] A method for analyzing impurities contained in a sample gas includes:
  a pretreatment step of reducing the partial pressure of water in a gas cell into which the sample gas is introduced to 10 Pa or less; and
  an analysis step of introducing the sample gas into the gas cell in which the pretreatment step has been carried out and detecting the impurities by Raman spectroscopy.

[2] The gas analyzing method according to [1], in which the pretreatment step is a step of purging the inside of the gas cell with a dry gas.

[3] The gas analyzing method according to [1] or [2], in which the impurity is at least one of a fluorine gas, a chlorine gas, a bromine gas, hydrogen fluoride, hydrogen chloride, hydrogen bromide, water, and carbon dioxide.

[4] The gas analyzing method according to any one of [1] to [3], in which the sample gas contains at least one of a fluorine compound, a chlorine compound, and a bromine compound.

Advantageous Effects of Invention

According to the present invention, the impurities in the sample gas can be analyzed with high accuracy by reducing the influence of the water present in the gas cell.

BRIEF DESCRIPTION OF DRAWINGS

The Figure is a conceptual view illustrating one example of a gas analyzer for explaining one embodiment of a gas analyzing method according to the present invention.

DESCRIPTION OF EMBODIMENTS

One embodiment of the present invention will be described below. This embodiment describes one example of the present invention, and the present invention is not limited to this embodiment. Further, this embodiment can be variously altered or modified and embodiments obtained by such alternations or modifications may also be included in the present invention.

A gas analyzing method according to this embodiment is a method for analyzing impurities contained in a sample gas, and includes a pretreatment step of reducing the partial pressure of water ($H_2O$) in a gas cell into which the sample gas is introduced to 10 Pa or less, and an analysis step of introducing the sample gas into the gas cell in which the pretreatment step has been carried out and detecting the impurities by Raman spectroscopy.

When water is present in the gas cell and the impurities to be analyzed can react with the water, there is a risk that a reaction between the impurities and the water proceeds during the analysis, resulting in a decrease in the analysis accuracy of the impurities decreases or the detection of reaction products between the impurities and the water. For example, there is a risk that water contained in the air present in the gas cell affects the analysis results. However, the gas analyzing method according to this embodiment reduces the amount of the water present in the gas cell by the pretreatment step, and therefore reduces the influence of the water on the analysis results, and enables the analysis of the impurities in the sample gas with high accuracy.

For example, qualitative analysis for determining the presence or absence of the impurities in the sample gas can be performed with high accuracy or quantitative analysis for measuring the amount of the impurities in the sample gas can also be performed with high accuracy.

The pretreatment step is a step applied to a space in the gas cell and the treatment may be applied to a small volume, and therefore the treatment is easy and does not require much time.

In particular, there is no necessity of performing a step of reducing the partial pressure of water for at least one selected from an optical path of an excitation light and an optical path of a Raman scattered light. Therefore, an airtight container for housing the optical path of the excitation light and the optical path of the Raman scattered light and a high-purity purge gas supply source for reducing moisture in the airtight container are not required. More specifically, the present invention can achieve the stabilization of the analysis accuracy with simplified equipment and a reduced use amount of an expensive high-purity purge gas, taking advantage of the fact that the presence of water in optical paths other than the optical paths to/from the gas cell hardly affects the analysis.

Further, when halogen, such as a chlorine gas ($Cl_2$) or hydrogen halide, such as hydrogen chloride (HCl), is contained in the sample gas, there is a risk that the presence of water in the gas cell not only affects the analysis results of the halogen or the hydrogen halide but leads to progressive corrosion in the gas cell. However, the gas analyzing method according to this embodiment reduces the amount of the water present in the gas cell by the pretreatment step, and therefore the corrosion of the gas cell is less likely to occur even when the halogen or the hydrogen halide is contained in the sample gas.

Next, one example of the configuration of a gas analyzer capable of implementing the gas analyzing method according to this embodiment and one example of a gas analyzing method using the gas analyzer are described with reference to the Figure. A gas analyzer in the Figure is a gas analyzer performing the pretreatment step by purging the inside of the gas cell with a dry gas. First, the gas analyzer in the Figure is described.

The gas analyzer in the Figure includes a gas cell 10 into which the sample gas to be analyzed is introduced, a light source 11 irradiating the sample gas in the gas cell 10 with a laser light which is the excitation light, a detector 12 detecting the Raman scattered light generated by irradiating the sample gas with the excitation light, and an exhaust pipe 13 for discharging gas, such as the sample gas, from the gas cell 10.

The gas analyzer in the Figure further includes a sample gas supply source 1 supplying the sample gas into the gas cell 10, a dry gas supply source 2 supplying a dry gas into the gas cell 10, a sample gas supply pipe 5 connecting the sample gas supply source 1 and the gas cell 10, and a dry gas supply pipe 6 connecting the dry gas supply source 2 and the gas cell 10.

The sample gas supply pipe 5 is further provided with a sample gas flow rate controller 3 controlling the flow rate of the sample gas. The dry gas supply pipe 6 is further provided with a dry gas flow rate controller 4 controlling the flow rate of the dry gas.

When the sample gas is analyzed using the gas analyzer in the Figure, the pretreatment step is first carried out. More specifically, the dry gas is introduced into the gas cell 10 from the dry gas supply source 2 via the dry gas supply pipe 6, and the inside of the gas cell 10 is purged with the dry gas. The flow rate of the dry gas is controlled by the dry gas flow rate controller 4. When the partial pressure of water in the gas cell 10 is reduced to 10 Pa or less, the introduction of the dry gas is terminated.

After the pretreatment step is completed, the analysis step is carried out. More specifically, the sample gas is introduced into the gas cell 10 from the sample gas supply source 1 via the sample gas supply pipe 5. Then, the sample gas in a state of being enclosed in the gas cell 10 or the sample gas in a state of circulating in the gas cell 10 is irradiated with the excitation light emitted from the light source 11. The excitation light emitted from the light source 11 enters the inside of the gas cell 10 through an incident window of the gas cell 10 to be emitted to the sample gas.

The Raman scattered light generated by irradiating the sample gas with the excitation light goes out of the gas cell 10 through an emission window of the gas cell and then is detected by the detector 12, and the impurities contained in the sample gas are analyzed.

[Gas Cell]

The gas cell 10 is constituted by providing a gas cell body with the incident window, the emission window, a gas introduction port, a gas discharge port, and the like. Materials of the gas cell body other than the incident window and the emission window are not particularly limited insofar as the materials do not react with the sample gas. For example, stainless steel, nickel, Inconel (registered trademark), fluororesin (e.g., Teflon (registered trademark)), quartz, and borosilicate glass are usable.

Materials of the incident window are not particularly limited insofar as the materials do not absorb the excitation light and do not react with the sample gas. For example, calcium fluoride ($CaF_2$), potassium bromide (KBr), and quartz are usable. Materials of the emission window are not particularly limited insofar as the materials do not absorb the Raman scattered light and do not react with the sample gas. For example, calcium fluoride, potassium bromide, and quartz are usable.

[Sample Gas Supply Source and Dry Gas Supply Source]

The sample gas supply source 1 is not particularly limited insofar as it can supply the sample gas to the gas cell 10, and a supply method, the form, and the size thereof are not particularly limited.

The dry gas supply source 2 is not particularly limited insofar as it can supply the dry gas to the gas cell 10, and a supply method, the form, and the size thereof are not particularly limited. For example, when a nitrogen gas ($N_2$) is used as the dry gas, a high-purity nitrogen gas cylinder is usable as the dry gas supply source 2.

[Light Source]

The light source 11 is not particularly limited insofar as it can emit the excitation light. For example, gas lasers, such as a helium neon laser and an argon laser, and solid lasers, such as a YAG laser, are usable.

[Detector]

The detector 12 includes a spectroscope and a photodetector. As the spectroscope, a monochromator or polychromator using a diffraction grating, a filter extracting a light of a specific wavelength, and the like are usable. As the photodetector, photomultiplier tubes, semiconductor photodetection devices, avalanche photodiodes, complementary metal-oxide-semiconductor sensors (CMOS), charge-coupled devices (CCD), and the like are usable.

[Pretreatment Step]

The pretreatment step is a step of reducing the partial pressure of the water in the gas cell 10 to 10 Pa or less before carrying out the analysis step. The partial pressure of the water in the gas cell 10 at the completion of the pretreatment step needs to be 10 Pa or less and is preferably 1 Pa or less and more preferably 0.1 Pa or less. When the water remains in the gas cell 10, there is a risk that the water measured value in the analysis results of the sample gas is large. The partial pressure of the water in the gas cell 10 can be quantified by the Raman spectroscopy. The partial pressure of the water in the gas cell 10 may be 0.01 Pa or more.

The contents of the pretreatment step are not particularly limited insofar as the partial pressure of the water in the gas cell 10 can be reduced to 10 Pa or less. Examples include a method for purging the inside of the gas cell 10 with a dry gas, a method for reducing the pressure inside the gas cell 10, a method for installing an adsorbent adsorbing the water in the gas cell 10, and a method for heating the gas cell 10, for example. In the pretreatment step, one of these methods may be implemented or a plurality of methods may be implemented in combination.

When the method for installing the adsorbent adsorbing the water in the gas cell 10 is used, a molecular sieve, silica gel, activated carbon, or the like is usable as the adsorbent.

In the method for purging the inside of the gas cell 10 with a dry gas, the inside of the gas cell 10 may be purged by circulating the dry gas or the inside of the gas cell 10 may be purged by pressurizing and filling the dry gas into the gas cell 10, and then exhausting the dry gas.

When the inside of the gas cell 10 is purged by circulating the dry gas, the flow rate of the dry gas is not particularly limited. When the capacity of the gas cell is, for example, 100 mL, the flow rate of the dry gas is preferably set to 50 mL/min or more and 5000 mL/min or less and more preferably set to 100 mL/min or more and 1000 mL/min or less. When the flow rate of the dry gas is expressed in terms of space velocity, the flow rate of the dry gas is preferably 30 $hr^{-1}$ or more and 6000 $hr^{-1}$ or less and more preferably 60 $hr^{-1}$ or more and 3000 $hr^{-1}$ or less. When the flow rate of the dry gas is within the ranges above, the water removal does not require much time, and a small amount of the dry gas is sufficient, which is economical. As the dry gas flow rate controller 4 controlling the flow rate of the dry gas, a common flow rate regulator is usable.

When the inside of the gas cell 10 is purged by pressurizing and filling the dry gas into the gas cell 10, and then exhausting the dry gas, the pressure during the pressurization is not particularly limited and is preferably set to 0.1 MPaA or more and 0.5 MPaA or less and more preferably set to 0.15 MPaA or more and 0.3 MPaA or less. When the dry gas is exhausted from the gas cell 10, the dry gas may be exhausted from the gas cell 10 in a state where the gas discharge port of the gas cell 10 is opened to the atmosphere or the dry gas may be exhausted from the gas cell 10 by connecting the gas discharge port of the gas cell 10 to a vacuum pump and reducing the pressure inside the gas cell 10 with the vacuum pump.

When the inside of the gas cell 10 is purged with a dry gas, the water removal efficiency is improved by heating the gas cell 10. The heating temperature is preferably 40° C. or more and 200° C. or less and more preferably 50° C. or more and 100° C. or less.

The type of the dry gas used in the pretreatment step is not particularly limited insofar as the gas does not react with the gas cell body, the incident window, and the emission window, and contains a small amount of water, and thus is dry. Gases not reacting with water are usable, and a nitrogen gas, helium (He), argon (Ar), and an oxygen gas ($O_2$) are usable.

Gases reacting with water, such as carbonyl fluoride ($COF_2$), are also usable as the dry gas. When carbonyl fluoride is used as the dry gas, the water and the carbonyl fluoride react to generate volatile hydrogen fluoride (HF) and carbon dioxide ($CO_2$), and therefore the water removal efficiency is improved. When carbonyl fluoride is used as the dry gas, it is preferable to circulate the carbonyl fluoride, and then purge the inside the gas cell 10 using helium, argon, or the like to remove the hydrogen fluoride and the carbon dioxide from the inside of the gas cell 10.

The moisture content of the dry gas is preferably 100 ppm by volume or less, more preferably 10 ppm by volume or less, and still more preferably 1 ppm by volume or less. The dry gas can be produced by bringing gas into contact with a desiccant, such as a molecular sieve, silica gel, or activated carbon, to reduce the moisture content.

[Analysis Step]

The analysis step is a step of introducing the sample gas into the gas cell in which the pretreatment step has been carried out and detecting impurities by the Raman spectroscopy. The analysis by the Raman spectroscopy may be applied to the sample gas in the state of being enclosed in the gas cell 10 or to the sample gas in the state of circulating in the gas cell 10. As the sample gas flow rate controller 3 controlling the flow rate of the sample gas, a common flow rate regulator is usable.

The flow rate of the sample gas is not particularly limited and is preferably set to 30 $hr^{-1}$ or more and 3000 $hr^{-1}$ or less and more preferably set to 60 $hr^{-1}$ or more and 600 $hr^{-1}$ or less in terms of the spatial velocity. When the flow rate of the sample gas is within the ranges above, the flow rate is likely to be high and the stability of the analysis accuracy of impurities (in particular, the accuracy of quantitative analysis) is likely to be high, and, in addition thereto, a small consumption amount of the sample gas is sufficient, which is economical.

The pressure inside the gas cell 10 during the implementation of the analysis step is not particularly limited and is preferably set to 0.05 MPaA or more and 0.5 MPaA or less and more preferably set to 0.1 MPaA or more and 0.3 MPaA or less. When the pressure inside the gas cell 10 is within the ranges above, even an extremely small amount of impurities are likely to be detected, and damage to the incident window and the emission window of the gas cell 10 is less likely to occur. When the analysis step is carried out in the gas cell 10 under pressurized conditions, a common back pressure valve may be used.

The gas composition in the optical path of the excitation light from the light source 11 to the gas cell 10 when the sample gas is analyzed is not particularly limited, and the atmosphere, a dry air, an inert gas, or the like may be acceptable. There is a possibility that the excitation light is attenuated when dust or dust is present in the optical path of the excitation light, and therefore the purge is preferably constantly performed by circulating the air, an inert gas, or the like.

Although the partial pressure of water in the optical path of the excitation light is not particularly limited and is preferably set to 4000 Pa or less and more preferably set to 1000 Pa or less. For example, the partial pressure of the water may be about 10 Pa or about 1000 Pa. When the partial pressure of the water is low, deliquescence of the incident window and the emission window of the gas cell 10 formed of salts, such as calcium fluoride and potassium bromide, is less likely to occur.

In particular, the partial pressure of the water in the optical path of the excitation light can be set to be larger than 10 Pa and preferably set to be 100 Pa or more. More specifically, there is no necessity of carrying out a step of reducing the partial pressure of the water in the optical path of the excitation light, and therefore an airtight container for housing the optical path of the excitation light and a high-purity purge gas supply source for reducing the moisture in the airtight container are not required.

The optical path of the excitation light from the light source 11 to the gas cell 10 is preferably covered with a cover member formed of materials not transmitting the excitation light to prevent scattering of the excitation light. The materials not transmitting the excitation light include metals, resins, and the like, and metals are preferable in terms of workability and durability, and stainless steel is more preferable.

When a stainless steel cover member is used, the pressure inside the cover member is not particularly limited and is preferably set to 1 Pa or more and 0.2 MPa or less. The temperature inside the cover member is not particularly limited and is preferably set to 0° C. or more and 100° C. or less.

The gas composition in the optical path of the Raman scattered light from the gas cell 10 to the detector 12 when the sample gas is analyzed is not particularly limited, and the air, a dry air, an inert gas, or the like may be acceptable. There is a possibility that the Raman scattered light is attenuated when dust or dust is present in the optical path of the Raman scattered light, and therefore the purge is preferably constantly performed by circulating the air, an inert gas, or the like.

Although the partial pressure of water in the optical path of the Raman scattered light is not particularly limited and is preferably set to 4000 Pa or less and more preferably set to 1000 Pa or less. For example, the partial pressure of the water may be about 10 Pa or about 1000 Pa. When the partial pressure of the water is low, deliquescence of the incident window and the emission window of the gas cell 10 formed of salts, such as calcium fluoride and potassium bromide, is less likely to occur.

In particular, the partial pressure of the water in the optical path of the Raman scattered light can be set to be larger than 10 Pa and preferably set to be 100 Pa or more. More specifically, there is no necessity of carrying out a step of reducing the partial pressure of the water in the optical path of the Raman scattered light, and therefore an airtight container for housing the optical path of the Raman scattered light and a high-purity purge gas supply source for reducing the moisture in the airtight container are not required.

The optical path of the Raman scattered light from the gas cell 10 to the detector 12 is preferably covered with a cover member formed of materials not transmitting the Raman scattered light to prevent a baseline rise and a noise increase in the detector 12. The materials not transmitting the Raman scattered light include metals, resins, and the like, and metals are preferable in terms of workability and durability, and stainless steel is more preferable.

When a stainless steel cover member is used, the pressure inside the cover member is not particularly limited and is preferably set to 1 Pa or more and 0.2 MPa or less. The temperature inside the cover member is not particularly limited and is preferably set to 0° C. or more and 100° C. or less.

[Sample Gas]

The type of the sample gas is not particularly limited. When the sample gas is a gas containing at least one of fluorine compounds, chlorine compounds, and bromine compounds, which are highly reactive with water, the gas analyzing method according to the present invention can be suitably applied.

Examples of the fluorine compounds include a fluorine gas ($F_2$), hydrogen fluoride, oxygen difluoride ($OF_2$), carbonyl fluoride, nitrosyl fluoride (NOF), and silicon tetrafluoride ($SiF_4$). Examples of the fluorine compounds further include halogen fluorides, such as chlorine trifluoride ($ClF_3$), chlorine pentafluoride ($ClF_5$), bromine trifluoride ($BrF_3$), bromine pentafluoride ($BrF_5$), iodine pentafluoride ($IF_5$), and iodine heptafluoride ($IF_7$) and boron fluorides, such as boron trifluoride ($BF_3$) and diboron tetrafluoride ($B_2F_4$). Examples of the fluorine compounds further include phosphorus fluorides, such as phosphorus trifluoride ($PF_3$) and phosphorus pentafluoride ($PF_5$), sulfur fluorides, such as sulfur tetrafluoride ($SF_4$) and disulfur decafluoride ($S_2F_{10}$), and fluorinated noble gases, such as xenon fluorides ($XeF_2$, $XeF_4$, $XeF_6$) and krypton difluoride ($KrF_2$). The content of the fluorine compounds in the sample gas is not particularly limited and is preferably 1% by volume or more and 100% by volume or less and more preferably 10% by volume or more and 99% by volume or less.

Examples of the chlorine compounds include a chlorine gas, hydrogen chloride, carbonyl chloride ($COCl_2$), and silicon tetrachloride ($SiCl_4$). Examples of the chlorine compounds further include halogen chlorides, such as bromine monochloride (BrCl), bromine trichloride ($BrCl_3$), iodine monochloride (ICl), and diiodine hexachloride ($I_2Cl_6$), boron chlorides, such as boron trichloride ($BCl_3$), phosphorus chlorides, such as phosphorus trichloride ($PCl_3$) and phosphorus pentachloride ($PCl_5$), and sulfur chlorides, such as sulfur dichloride ($SCl_2$), disulfur dichloride ($S_2Cl_2$), and sulfur tetrachloride ($SCl_4$). The content of the chlorine compounds in the sample gas is not particularly limited and is preferably 1% by volume or more and 100% by volume or less and more preferably 10% by volume or more and 99% by volume or less.

Examples of the bromine compounds include a bromine gas ($Br_2$), hydrogen bromide (HBr), and carbonyl bromide ($COBr_2$). Examples of the bromine compounds further include halogen bromides, such as iodine monobromide (IBr) and iodine tribromide ($IBr_3$), boron bromides, such as boron tribromide ($BBr_3$), phosphorus bromides, such as phosphorus tribromide ($PBr_3$) and phosphorus pentabromide ($PBr_5$), and sulfur bromides, such as sulfur dibromide ($SBr_2$). The content of the bromine compounds in the sample gas is not particularly limited and is preferably 1% by volume or more and 100% by volume or less and more preferably 10% by volume or more and 99% by volume or less.

When the sample gas is carbonyl fluoride, there is a risk that the presence of the water in the gas cell 10 causes a reaction between the carbonyl fluoride and the water, so that hydrogen fluoride and carbon dioxide are generated, resulting in a decrease in the analysis accuracy.

[Impurities]

The types of the impurities contained in the sample gas are not particularly limited. When the impurities are halogen, hydrogen halide, water, and carbon dioxide, the gas analyzing method according to the present invention can be particularly suitably applied. Examples of the halogen include a fluorine gas, a chlorine gas, and a bromine gas. Examples of the hydrogen halide include hydrogen fluoride, hydrogen chloride, and hydrogen bromide.

However, the fluorine compounds, chlorine compounds, and bromine compounds and the impurities described above contained in the sample gas are not the same type of compounds but different types of compounds.

EXAMPLES

The present invention is more specifically described with reference to Examples and Comparative Examples below.

EXAMPLE 1

Using a carbonyl fluoride gas as the sample gas and helium as the dry gas, impurities contained in the sample gas were quantitatively analyzed using a gas analyzer having the same configuration as the gas analyzer illustrated in the Figure.

The capacity of a gas cell body is 100 mL, the material is stainless steel SUS316, and the material of an incident window and an emission window of a gas cell is calcium fluoride.

A Raman spectrophotometer provided in the gas analyzer has a YAG laser with a wave number of 532 nm and a maximum output of 10 W as a light source and has a monochromator spectroscope with an F value of F/3.6 and a photodetector using a charge-coupled device.

An optical path from the light source to the gas cell was covered with a cover member formed of stainless steel SUS304 to prevent the leakage of a laser light, and the air compressed by an air compressor was circulated in the cover member at a flow rate of 1000 mL/min. The partial pressure of water in the air compressed by the air compressor was measured to be 1000 Pa.

An optical path from the gas cell to the photodetector was covered with a cover member formed of stainless steel SUS304 to prevent the entrance of light from the outside, and the air compressed by an air compressor was circulated in the cover member at a flow rate of 1000 mL/min. The partial pressure of water in the air compressed by the air compressor was measured to be 1000 Pa.

First, the pretreatment step was carried out using the gas analyzer. Helium adjusted to have a flow rate of 100 mL/min via a dry gas flow rate controller (Digital mass flow controller SEC-N100 (trade name) manufactured by HORIBA STEC Co., Ltd.) was supplied to the gas cell from a high-purity helium cylinder, which is the dry gas supply source. The partial pressure of water in the helium was 0.05 Pa as measured by a dew point meter. The temperature of the gas cell during the circulation of the helium was set at 20° C., and the pressure inside the gas cell was set to 0.1 MPaA. The partial pressure of water in the gas cell was 0.1 Pa as measured by the Raman spectrophotometer 60 minutes after the start of the circulation of the helium.

The partial pressure of water in the optical path of the excitation light was 1000 Pa as measured using a water vapor detector tube No. 6 manufactured by GASTEC CORPORATION. The partial pressure of water in the optical path of the Raman scattered light was 1000 Pa as measured using a water vapor detector tube No. 6 manufactured by GASTEC CORPORATION.

Next, the analysis step was carried out using the gas analyzer. More specifically, after stopping the circulation of the helium, the carbonyl fluoride gas adjusted to have a flow rate of 100 mL/min via the sample gas flow rate controller (Digital mass flow controller SEC-N100 (trade name) manufactured by HORIBA STEC Co., Ltd.) was supplied to the gas cell from a carbonyl fluoride gas cylinder, which is the sample gas supply source.

When the amount of impurities in the carbonyl fluoride gas in the gas cell was measured by the Raman spectrophotometer ten minutes after the start of the circulation of the carbonyl fluoride gas, 121 ppm by volume of a nitrogen gas, 58 ppm by volume of carbon dioxide, and 23 ppm by volume of hydrogen fluoride were detected.

After the measurement of the amount of the impurities, the inner surfaces of the incident window, the emission window, and the gas cell body were observed, but no corrosion was observed.

Example 2

The amount of impurities in the carbonyl fluoride gas in the gas cell was measured by the Raman spectrophotometer in the same manner as in Example 1, except for setting the circulation time of the helium in the pretreatment step to 30 minutes. As a result, the partial pressure of water in the gas cell after the implementation of the pretreatment step (30 minutes after the start of the circulation of the helium) was 6 Pa.

The measurement results of the impurities in the analysis step were as follows: 121 ppm by volume of nitrogen, 58 ppm by volume of carbon dioxide, and 23 ppm by volume of hydrogen fluoride. Further, after the measurement of the amount of the impurities, the inner surfaces of the incident window, the emission window, and the gas cell body were observed, but no corrosion was observed.

Comparative Example 1

The amount of impurities in the carbonyl fluoride gas in the gas cell was measured by the Raman spectrophotometer in the same manner as in Example 1, except for not carrying out the pretreatment step. As a result, the partial pressure of water in the gas cell was measured, prior to the introduction of the sample gas, to be 2000 Pa. The measurement results of the impurities in the analysis step were as follows: 122 ppm by volume of nitrogen, 530 ppm by volume of carbon dioxide, and 490 ppm by volume of hydrogen fluoride, and a decrease in the measurement accuracy was observed. Further, when the inner surfaces of the incident window, the emission window, and the gas cell body were observed after the measurement of the amount of the impurities, clouding of the emission window and corrosion of the gas cell body were observed.

Comparative Example 2

The amount of impurities in the carbonyl fluoride gas in the gas cell was measured by the Raman spectrophotometer in the same manner as in Example 1, except for setting the circulation time of the helium in the pretreatment step to 10 minutes. As a result, the partial pressure of water in the gas cell after the implementation of the pretreatment step (10 minutes after the start of the circulation of the helium) was 18 Pa. The measurement results of the impurities in the analysis step were as follows: 122 ppm by volume of nitrogen, 85 ppm by volume of carbon dioxide, and 51 ppm by volume of hydrogen fluoride, and a decrease in the measurement accuracy was observed. Further, after the measurement of the amount of the impurities, the inner surfaces of the incident window, the emission window, and the gas cell body were observed, but no corrosion was observed.

REFERENCE SIGNS LIST 1 sample gas supply source
2 dry gas supply source
3 sample gas flow rate controller
4 dry gas flow rate controller
sample gas supply pipe
6 dry gas supply pipe
10 gas cell
11 light source
12 detector
13 exhaust pipe

The invention claimed is:

1. A method for analyzing impurities contained in a sample gas, comprising:
a pretreatment step of reducing a partial pressure of water in a gas cell into which the sample gas is introduced to 10 Pa or less; and
an analysis step of introducing the sample gas into the gas cell in which the pretreatment step has been carried out and detecting the impurities by Raman spectroscopy;
wherein the pretreatment step comprises not reducing the partial pressure of water for at least one selected from optical paths of an excitation light path and an optical path of a Raman scattered light.

2. The gas analyzing method according to claim 1, wherein the pretreatment step is a step of purging an inside of the gas cell with a dry gas.

3. The gas analyzing method according to claim 1, wherein the impurity is at least one of a fluorine gas, a chlorine gas, a bromine gas, hydrogen fluoride, hydrogen chloride, hydrogen bromide, water, and carbon dioxide.

4. The gas analyzing method according to claim 1, wherein the sample gas contains at least one of a fluorine compound, a chlorine compound, and a bromine compound.

5. The gas analyzing method according to claim 2, wherein the impurity is at least one of a fluorine gas, a chlorine gas, a bromine gas, hydrogen fluoride, hydrogen chloride, hydrogen bromide, water, and carbon dioxide.

6. The gas analyzing method according to claim 2, wherein the sample gas contains at least one of a fluorine compound, a chlorine compound, and a bromine compound.

7. The gas analyzing method according to claim 3, wherein the sample gas contains at least one of a fluorine compound, a chlorine compound, and a bromine compound.

\* \* \* \* \*